United States Patent
Hartmann et al.

(10) Patent No.: US 11,066,972 B2
(45) Date of Patent: Jul. 20, 2021

(54) METHOD FOR DIAGNOSING A PARTICLE FILTER OF A MOTOR VEHICLE USING A PARTICLE SENSOR CONNECTED DOWNSTREAM

(71) Applicant: Robert Bosch GmbH, Stuttgart (DE)

(72) Inventors: Gerd Hartmann, Weingarten (DE); Markus Eitel, Farmington Hills, MI (US); Steve Kautzschmann, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/751,304

(22) Filed: Jan. 24, 2020

(65) Prior Publication Data

US 2020/0240303 A1 Jul. 30, 2020

(30) Foreign Application Priority Data

Jan. 25, 2019 (DE) .................... 10 2019 200 937.9

(51) Int. Cl.
*F01N 3/023* (2006.01)
*F01N 11/00* (2006.01)
*F02D 41/00* (2006.01)
*F02D 41/02* (2006.01)
*F02D 41/14* (2006.01)

(52) U.S. Cl.
CPC .............. *F01N 3/023* (2013.01); *F01N 11/00* (2013.01); *F01N 11/002* (2013.01); *F02D 41/0037* (2013.01); *F02D 41/029* (2013.01); *F01N 2550/00* (2013.01); *F01N 2560/05* (2013.01); *F01N 2560/20* (2013.01); *F02D 41/1494* (2013.01)

(58) Field of Classification Search
CPC ........ F01N 11/00; F01N 11/002; F01N 3/023; F01N 9/002; F01N 2550/00; F01N 2560/05; F01N 2560/20; F02D 41/0037; F02D 41/029; F02D 41/062; F02D 41/1466; F02D 41/1494
See application file for complete search history.

(56) References Cited

U.S. PATENT DOCUMENTS

| | | | |
|---|---|---|---|
| 2012/0186230 A1* | 7/2012 | Yahata | F02D 41/1466 60/274 |
| 2019/0271629 A1* | 9/2019 | Zhang | G01N 15/0618 |
| 2020/0131972 A1* | 4/2020 | Herberger | F01N 13/008 |

* cited by examiner

Primary Examiner — Brandon D Lee
(74) Attorney, Agent, or Firm — Michael Best & Friedrich LLP

(57) ABSTRACT

In a method for diagnosing a particle filter of a motor vehicle a particle sensor which is connected downstream and has a ceramic sensor element is used, wherein, for the particle sensor, regeneration (10) of the ceramic sensor element is provided by thermal heating to a specific temperature and for a specific time after the start of the motor vehicle. Within the scope of an on-board diagnosis a confirmed diagnosis result is output after a repeated occurrence of a first diagnosis result. In the proposed method reduced regeneration (40) of the ceramic sensor element takes place after a first diagnosis result (30).

15 Claims, 2 Drawing Sheets

METHOD FOR DIAGNOSING A PARTICLE FILTER OF A MOTOR VEHICLE USING A PARTICLE SENSOR CONNECTED DOWNSTREAM

BACKGROUND OF THE INVENTION

The present invention relates to a method for diagnosing a particle filter of a motor vehicle using a particle sensor connected downstream, as well as to a computer program, to a machine-readable storage medium and to an electronic control device, which are configured to carry out this method.

As is known, various devices for reducing the emission load are provided in the exhaust train of an internal combustion engine of a motor vehicle. In this context, for example particle filters, in particular diesel particle filters (DPF), are used. To monitor the function of a particle filter, particle sensors are used which are installed downstream of the particle filter. The operation of a particle sensor is generally based on a cyclical measuring principle. In this context, each sensor measuring cycle starts with regeneration of the ceramic sensor element whenever the ignition of the motor vehicle is switched on after the dew point release of the sensor. In this context, the soot which is deposited on the electrode of the particle sensor is burnt off by thermal heating to a defined ceramic temperature. During the subsequent thermalization phase, a thermal equilibrium becomes established between the ceramic sensor element and the exhaust gas. The ceramic sensor element therefore cools down to a certain extent. When a specific temperature threshold value is undershot at the sensor element, the measuring phase can be started after the requesting of an OBD (On-Board Diagnosis) measuring cycle. The measurement is based on the fact that in the case of a defected particle filter soot accumulates on the sensor element of the particle sensor which is connected downstream. This can be detected by applying a measuring voltage to the sensor element. As a result of the accumulation of soot, the sensor current rises measurably after the application of a measuring voltage and changes into a linear rise starting from a certain current threshold. According to the OBD legislation, this is detected as a defective particle filter. For the measurement itself, a predicted triggering time is provided in this context, wherein after the expiry of the triggering time it is checked whether the sensor current is higher than the predefined current threshold. After the termination of the sensor measuring phase it is possible, e.g. after the next start of the motor vehicle, for a new sensor measuring cycle to take place starting with renewed thermal sensor regeneration. This means that before each measuring cycle the sensor is always completely regenerated and the accumulated soot is burnt away from it. In principle, there is the possibility here of setting or defining the number of measuring cycles (typically 1 to 3) up to the formation of a result. Furthermore, it is possible that after the formation of a result within a driving cycle a renewed measuring cycle is not started or the measuring cycle is allowed to run continuously, that is to say also beyond the formation of a result.

Before the driver is informed of such a measurable fault of the particle filter through the illumination of an engine warning light, and a fault storage entry is made, there is provision that in subsequent driving cycles a fault must have occurred repeatedly, and the particle filter is repeatedly detected as faulty in a predefined number of measuring cycles, so that a confirmed diagnosis result (fault) is only obtained at that point. The OBD measuring phase must also be repeated to confirm an okay result.

SUMMARY OF THE INVENTION

The proposed method for diagnosing a particle filter of a motor vehicle, in particular a diesel particle filter, is based in the first instance on the method from the prior art which is described at the beginning, wherein an on-board diagnosis is carried out using a particle sensor which is connected downstream and has a ceramic sensor element. Regeneration of the ceramic sensor element of the particle sensor by thermal heating to specific temperature and for a specific time is provided for the particle sensor after the start of the motor vehicle. Within the scope of the on-board diagnosis a confirmed OBD diagnosis result (fault result or okay result) is output only after repeated occurrence of the OBD result. In particular, during the diagnosis of the particle filter, a fault message is output only after repeated occurrence of a fault which has been detected on the basis of the particle sensor. The crucial point of the proposed method is that after a detected OBD result has first occurred, reduced regeneration of the ceramic sensor element is performed for the next measuring cycle. The reduced regeneration of the ceramic sensor element can take place, for example, in such a way that the specific time for the regeneration of the ceramic sensor element during the thermal heating is shortened and/or that the specific time for the regeneration of the ceramic sensor element during the thermal heating is reduced. In particular, the conditions for the reduction of the regeneration of the ceramic sensor element are selected here in such a way that at least some of the particles deposited on the ceramic sensor element, that is to say in particular deposited soot particles, are burnt off so that despite the reduction in the regeneration of the ceramic sensor element, a measurable effect is present in the form of a reduction in the sensor current in comparison with the sensor current before the (reduced) regeneration.

The particular advantage of the proposed method is that the time up to which a confirmed diagnosis result of the particle filter is provided is shortened. Therefore, a defective particle filter can be detected more quickly and a driving mode with an excessively high emission load can be avoided. Furthermore, the proposed method provides improvements in the diagnostic frequency and therefore in the IUMPR (In use Monitoring Performance Ratio) of the DPF diagnosis and in the demonstrability in the case of OBD certification. In the proposed method, as in conventional methods, a plurality of results are also used up to the switching on of the engine warning light, in order thereby to facilitate better statistical robustness. Nevertheless, the proposed method makes it possible to arrive more quickly at a confirmed particle filter OBD result. In this context, in the proposed method there is provision to carry out normal, i.e. complete sensor regeneration, up to the start of a driving cycle in a manner known per se, in order to burn off the accumulated soot completely from the ceramic sensor element, until an OBD result occurs for the first time on the basis of a measurement with the particle sensor. This customary sensor regeneration is carried out until a first OBD result, that is to say a first fault signal occurs during the measurement with the particle sensor, or a first okay result occurs. As soon as an OBD result is provided for the first time, the regeneration of the ceramic sensor element is performed in a reduced fashion. As a result of the reduction in the sensor regeneration, that is to say in particular as a result of shortening of the regeneration time and/or a reduction in the temperature during the regeneration, the soot is not completely burnt off from the sensor element. Therefore, in the next measuring cycle soot is already present on the sensor element at the start of the changeover into the measuring phase. As a result, in one preferred embodiment, the measuring period up to the renewed increasing of the measuring current can be shortened so that the diagnosis result can be provided earlier. It is therefore possible to obtain both a confirmed defect result and a confirmed okay result more quickly. In particular there is a saving in time when the time for the sensor regeneration is shortened. Conventional sensor regeneration lasts, for example, for 90 seconds. If this time is shortened, for example, to 60 seconds, this already provides a time advantage. If in addition to or as an alternative to shortening of the sensor regeneration, a reduced regeneration temperature is provided this entails the further advantage that the sensor loading which is associated with high temperatures is reduced. In addition, when there is a reduced regeneration temperature it is also possible to shorten the necessary time for the thermalization phase.

In order to carry out a measurement with the particle sensor, an electrical voltage is applied in a manner known per se to the particle sensor and it is checked whether the resulting current at the sensor is below a predefinable threshold value and/or near to zero after a predefinable time period (predicted triggering time). If the resulting current at the sensor element is above the threshold value, a fault is generated as a particle filter OBD result. If the resulting current is below the threshold value, e.g. the sensor current=0, the OBD result is an okay result (satisfactory result). When the OBD diagnosis is carried out, in the first instance the sensor element of the sensor is initially completely regenerated in a manner known per se, after the start of the driving cycle and corresponding release, with the objective of burning off the soot on the sensor element completely. After the cooling down of the sensor element to a provided temperature, the sensor measuring voltage is switch on and the measuring phase is started. If the sensor current is then higher than a predefinable threshold value when the predicted triggering time is reached, it is inferred that there is a defected particle filter and the measuring phase is ended. A correctly operating particle filter is detected if the sensor current is lower than the provided threshold value when the predicted triggering time is reached. If this first OBD result is obtained, according to the proposed method the regeneration which is provided for the ceramic sensor element before a renewed measuring cycle is performed in a reduced manner. The reduced regeneration can preferably take place directly afterwards, independently of the driving cycle. After the reduced regeneration of the sensor element, during which the soot has not been completely burnt off from the sensor element, a renewed measuring phase is performed. In this context, there can advantageously be provision that the predicted triggering time, that is to say the time period up to the checking after the switching on of the voltage, is shortened and therefore there is saving in time. This is based on the fact that the time up to the point when the defective current threshold is reached is shorter as a result of the incomplete burning off of soot from the sensor element. If the resulting current is above the threshold value after the expiry of the shortened time period, that is to say the shortened predicted triggering time, it is inferred that there is a fault and the defect result can be confirmed.

Furthermore there can be provision that during the measurement subsequent to the reduced regeneration of the ceramic sensor element it is checked whether after the application of an electrical voltage the resulting current at the sensor element is below the voltage value which had been measured before the reduced regeneration of the ceramic sensor element. In this way it can be checked whether some of the soot on the sensor element has actually been burnt off. If this is the case, it is assumed that the conditions during the reduced regeneration were sufficient to burnt off part of the soot from the sensor element. If this is not the case, the reduced regeneration can be repeated. This step of checking the reduced regeneration can, if appropriate, be skipped if an okay result was obtained as a first result of the OBD diagnosis.

In one preferred refinement of the proposed method there is provision that reduced regeneration of the sensor element takes place repeatedly after renewed occurrence of a detected fault after reduced regeneration of the sensor element. If the fault no longer occurs after reduced regeneration of the ceramic sensor element, a confirmed defect result is not provided for the DBF diagnosis.

If a fault is detected again after reduced regeneration and, in particular, after repeated reduced regeneration of the ceramic sensor element, it can be inferred that there is a confirmed defect result for the DPB diagnosis.

The invention also comprises a computer program which is configured to carry out the steps of the described method. This computer program can advantageously be stored on a machine-readable storage medium. Furthermore, the invention comprises an electronic control device which is configured to carry out the steps of the proposed method.

BRIEF DESCRIPTION OF THE DRAWINGS

Further features and advantages of the invention result from the following description of the exemplary embodiments in conjunction with the drawings. In this context, the individual features can each be implemented independently or in combination with one another.

DETAILED DESCRIPTION

Figure 1:
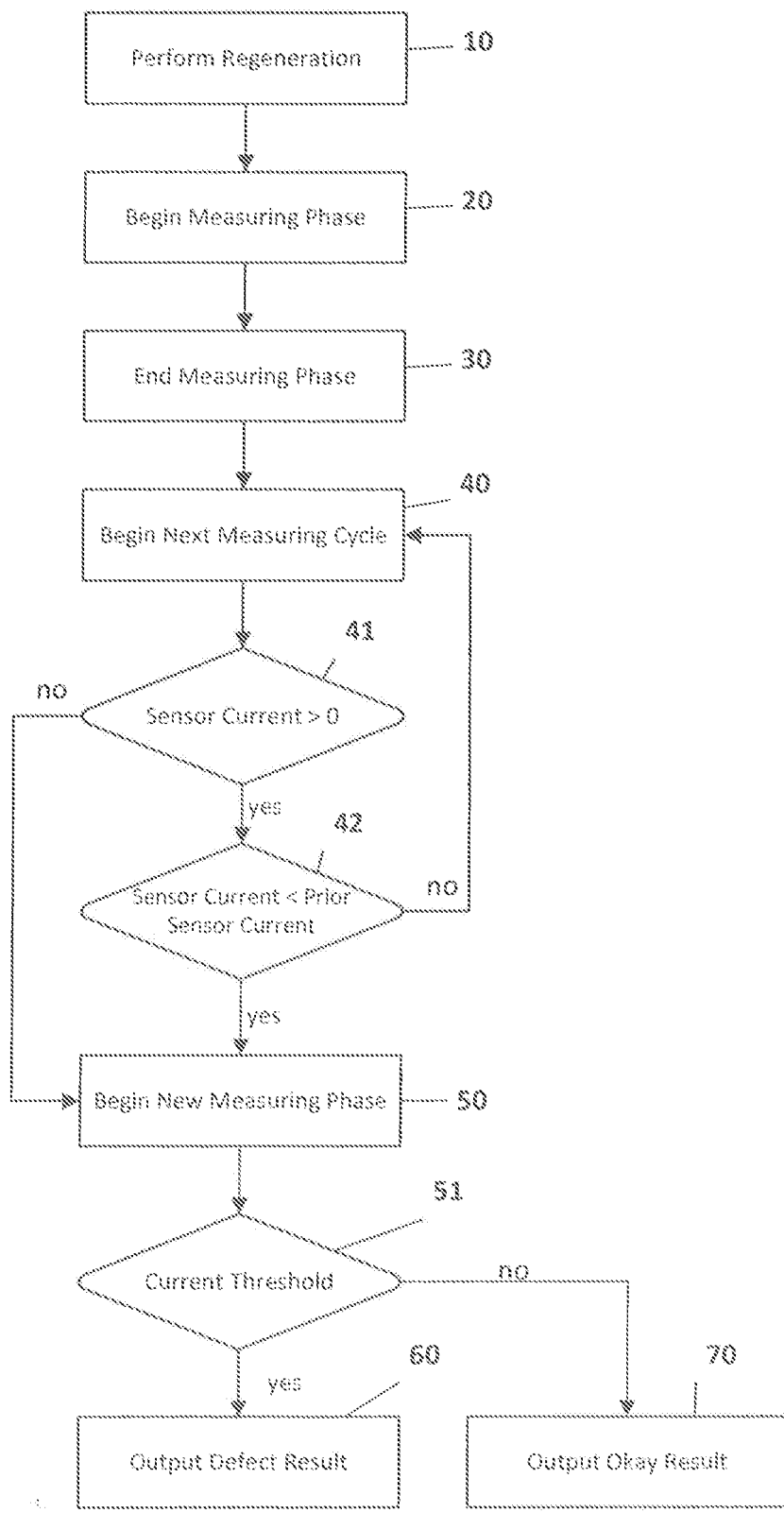
FIG. 1 shows a block diagram relating to the execution of an exemplary embodiment of the proposed method.

The FIGURE shows a block diagram illustrating the sequence of the proposed method in an exemplary embodiment. In step 10 at the start of a driving cycle, complete sensor regeneration is performed with the objective of completely burning off particles or soot from the ceramic sensor element of a particle sensor connected downstream of the diesel particle filter (DPF). After temperature equalization between the ceramic sensor element and the surrounding exhaust gas in a subsequent thermalization phase, a measuring phase 20 follows when the OBD diagnosis is requested. For this, a sensor measuring voltage is connected. When a predicted triggering time is reached it is checked whether the resulting sensor current is higher than a predefinable threshold value or not. If this threshold value is reached or exceeded, a fault is detected with respect to the DPF. If the threshold value is not reached (e.g. sensor current=0), an okay result is provided. After this first DPF-OBD result (fault or okay), the measuring phase is ended in step 30. According to the proposed method, after this DPF-OBD result, reduced sensor regeneration is performed at the start of the next measuring cycle in step 40 by, in particular, shortening or reducing the time for the sensor regeneration and/or the temperature for the sensor regeneration. In this context, the soot is not completely burnt off from the sensor element. Subsequently, in step 41 it is interrogated whether the sensor current which was measured for the DPF-OBD result in step 30 is higher than 0. If this is the case, a fault has been detected for the first OBD result. If this is not the case, an okay result has been detected as the first OBD result. In the first case, it is interrogated in step 42 whether the sensor current of the current measuring phase is lower than the sensor current before the reduced regeneration. If this is not the case, reduced regeneration is performed again by jumping back to step 40. In this step 42 it is therefore checked whether the conditions for the reduced sensor regeneration are selected such that part of the soot has already been burnt off during this reduced sensor regeneration, which becomes apparent from a reduction of the sensor current compared to the current before the regeneration. If the reduced sensor regeneration was not successful in this sense, the reduced sensor regeneration is repeated according to step 40. If the interrogation in step 42 reveals that the sensor current was lower after the reduced sensor regeneration than before the shortened sensor regeneration, there is a changeover to the measuring phase 50, wherein this measuring phase is carried out with a shortened predicted triggering time. If the interrogation in step 41 has revealed that in the DPF-OBD result the sensor current was not higher than 0 (okay result), it is possible to jump directly to the measuring phase 50 with a shortened predicted triggering time. This measuring phase 50 with a shortened predicted triggering time is based on the fact that after the reduced sensor regeneration 40 the soot collection phase of the sensor starts with residual soot already present, for which reason the time until the defect current threshold is reached is shorter. Therefore, the predicted triggering time of the sensor can be shortened in the measuring phase 50. In step 51 the interrogation takes place as to whether the resulting current in the case of the shortened triggering time is above the threshold value. If this is the case, in step 60 the outputting of a confirmed defect result for the DPF diagnosis takes place, and the measuring phase is ended. If the current is below the defect current threshold when the shortened triggering time is reached, in step 70 a confirmed okay result of the DPF diagnosis is provided and the measuring phase is ended. In a corresponding way, the described method is also suitable for diagnosing a particle filter of a spark ignition engine.

The short circuit diagnosis of the particle sensor is expediently gated out at the end of the first reduced sensor regeneration 40, since otherwise the sensor operation could be blocked and no further reduced sensor regeneration would be possible. If the sensor current is still at the maximum after the repeated reduced sensor regeneration 40, a short circuit of the sensor element is present and the sensor operation is blocked. The shunt diagnosis is expediently gated out during the first and repeated reduced sensor regeneration 40, in order to prevent blocking of the sensor operation. In this context, the term shunt diagnosis is used if the sensor current is below a threshold or close to zero after complete sensor regeneration. In the case of reduced sensor regeneration according to proposed method there is provision that residual soot remains on the sensor element, which soot can, as intended, be measured as a current. This residual soot could incorrectly be detected as a shunt. Therefore, shunt diagnosis should expediently not be carried out after reduced sensor regeneration, and said shunt diagnosis should therefore be gated out.

Figure 2:
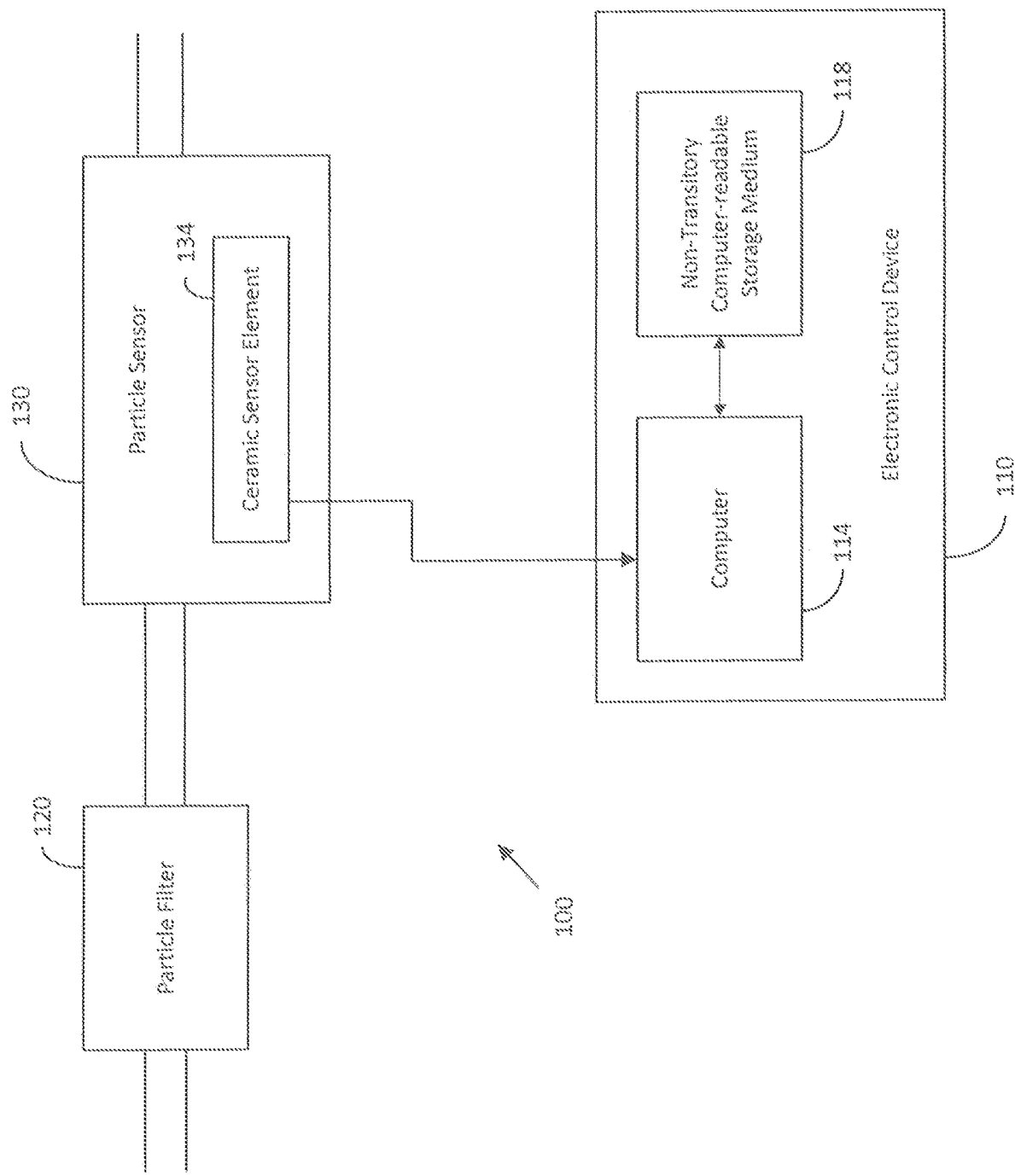
FIG. 2 shows a block diagram of an electronic control device and a portion of an exhaust system.

FIG. 2 shows a block diagram 100 that includes an electronic control device 110 having a computer 114 and a non-transitory computer-readable storage medium 118. The block diagram shows a particle filter 120 and a particle sensor 130 downstream from the particle filter. The particle sensor 130 includes a ceramic sensor element 134.

The invention claimed is:

1. A method for diagnosing a particle filter of a motor vehicle using a particle sensor which is connected downstream of the particle filter and that has a ceramic sensor element, the method comprising:
regenerating (10) the ceramic sensor element by thermal heating the ceramic sensor element to a specific temperature and for a specific time after the start of the motor vehicle,
diagnosing the particle filter to obtain a first diagnosis result (30), and
performing reduced regeneration (40) of the ceramic sensor element after the first diagnosis result (30) to obtain a confirmed diagnosis result for the particle filter.

2. The method according to claim 1, wherein the specific time for the regeneration of the ceramic sensor element is shortened for performing the reduced regeneration (40) of the ceramic sensor element.

3. The method according to claim 1, wherein the specific temperature for the regeneration of the ceramic sensor element is reduced for performing the reduced regeneration (40) of the ceramic sensor element.

4. The method according to claim 1, wherein the conditions for performing the reduction of the regeneration of the ceramic sensor element are selected in such a way that at least some of the particles deposited on the ceramic sensor element are burnt off.

5. The method according to claim 1, wherein, for a measurement (20) with the particle sensor, applying an electrical voltage to the particle sensor and checking whether the resulting current is below a predefinable threshold value after a predefinable time period, wherein a fault is detected when the resulting current is above the threshold value.

6. The method according to claim 5, wherein the predefinable time period is shortened (50) up to the checking as to whether the resulting current is below the predefinable threshold value, after the execution of reduced regeneration (40) of the ceramic sensor element, wherein a fault is detected (60) if the resulting current is above the threshold value after the shortened time period.

7. The method according to claim 1, wherein, for a measurement with the particle sensor an electrical voltage is applied to the particle sensor subsequent to the reduced regeneration (40) of the ceramic sensor element, and it is checked (42) whether the resulting current is below the current value which had been measured before the reduced regeneration of the ceramic sensor element, wherein the reduced regeneration (40) of the ceramic sensor element is repeated when the resulting current is not below the current value which had been measured before the reduced regeneration of the ceramic sensor element.

8. The method according to claim 1, wherein reduced regeneration (40) of the ceramic sensor element is performed repeatedly after renewed occurrence of a detected fault.

9. The method according to claim 1, wherein in that a confirmed defect result (60) is inferred for the particle filter diagnosis if a fault is detected again after reduced regeneration (40) of the ceramic sensor element.

10. A non-transitory, computer-readable storage medium containing instructions that when executed by a computer cause the computer to control an exhaust system of a motor vehicle having a particle filter and a particle sensor which is connected downstream of the particle filter and that has a ceramic sensor element, by:
    regenerating (10) the ceramic sensor element by thermal heating the ceramic sensor element to a specific temperature and for a specific time after the start of the motor vehicle,
    diagnosing the particle filter to obtain a first diagnosis result (30), and
    performing reduced regeneration (40) of the ceramic sensor element after the first diagnosis result (30) to obtain a confirmed diagnosis result for the particle filter.

11. An electronic control device which is configured to control an exhaust system of a motor vehicle having a particle filter and a particle sensor which is connected downstream of the particle filter and that has a ceramic sensor element, by:
    regenerating (10) the ceramic sensor element by thermal heating the ceramic sensor element to a specific temperature and for a specific time after the start of the motor vehicle,
    diagnosing the particle filter to obtain a first diagnosis result (30), and
    performing reduced regeneration (40) of the ceramic sensor element after the first diagnosis result (30) to obtain a confirmed diagnosis result for the particle filter.

12. The electronic control device according to claim 11, wherein the specific time for the regeneration of the ceramic sensor element is shortened for performing the reduced regeneration (40) of the ceramic sensor element.

13. The electronic control device according to claim 11, wherein the specific temperature for the regeneration of the ceramic sensor element is reduced for performing the reduced regeneration (40) of the ceramic sensor element.

14. The electronic control device according to claim 11, wherein the conditions for performing the reduction of the regeneration of the ceramic sensor element are selected in such a way that at least some of the particles deposited on the ceramic sensor element are burnt off.

15. The electronic control device according to claim 11, wherein, for a measurement (20) with the particle sensor, applying an electrical voltage to the particle sensor and checking whether the resulting current is below a predefinable threshold value after a predefinable time period, wherein a fault is detected when the resulting current is above the threshold value.

* * * * *